Nov. 9, 1943.  A. GRAVES ET AL  2,334,085
DEVICE FOR LOCATION OF A SOURCE OF RADIATION
Filed Jan. 21, 1942  5 Sheets-Sheet 1

Patented Nov. 9, 1943

2,334,085

UNITED STATES PATENT OFFICE 2,334,085

DEVICE FOR LOCATION OF A SOURCE OF RADIATION

Arnold Graves, Surbiton, and Richard Evan Prichard, Maidenhead, England, assignors to Alltools, Limited, Brentford, Middlesex, England, a company of Great Britain Application January 21, 1942, Serial No. 427,670
In Great Britain November 1, 1940

11 Claims. (Cl. 250—11)

It is known that aircraft and sea-going vessels may be directed to land under conditions of darkness or fog by systems of multiple directional wireless signals transmitted from the ground. In particular (under the Lorenz system) two diverging beams with an overlapping sector are transmitted, the one beam transmitting a continuous sequence of evenly spaced dots, and the other beam transmitting a continuous sequence of evenly spaced dashes. As the beam sectors overlap it is clear that an aircraft approaching along the central overlapping portion of the two beams will receive a signal combining these two sequences of dots and dashes into one continuous signal or note. Divergence from the correct line of approach is indicated by a change in the received signal from a continuous note to a series either of dots or dashes which indicate whether the error is to starboard or to port.

It has also been proposed to provide two loop aerials on an aircraft for receiving a single directional beam radiated from the ground, and to couple a receiving set on the aircraft with the two aerials alternatively and in rapid succession by means of mechanical switches, the contacts of which are shaped to produce dot signals when the one aerial is in circuit and dash signals when the other aerial is in circuit; so that when one aerial only is receiving radiation, the persistence of dots or dashes will indicate which of the two aerials it is.

Of the radiation likely to be emitted by an aircraft to be located at night, the most easily detectable are infra-red radiations. The invention provides an apparatus for the directional location of a source of infra-red radiations comprising as its essential elements (a) a pair of thermocouples or equivalent devices sensitive to infra-red radiation as defined below, (b) a focussing device for focussing the received radiation on the thermocouples so that, when the apparatus is pointing direct at the source, both thermocouples will be energized, while on deviation from the source the thermocouples will be selectively de-energized according to the direction of deviation, (c) amplifiers associated one with each thermocouple, (d) means for producing in the output circuits of the two amplifiers, when the thermocouples are energized, pulsating currents of substantially equal frequency, (e) means for imposing on the output circuits lower frequency modulations which are different and distinguishable from one another, and (f) an indicator common to the two output circuits for emitting a visual or aural signal representing the combined effect of the modulated currents in the output circuits.

The invention thus provides a self-contained apparatus, which can be installed on an aircraft, ship or land vehicle, and will enable the operator to tell immediately from the indicator whether or not the apparatus is properly directed at the source.

The expression "thermocouple" as used herein and in the appended claims, is intended to include a bolometer or equivalent device sensitive to infra-red radiation and effective to produce, when energized by the radiation, an electromotive force, or a change in an electromotive force applied to it.

When the focussing device is pointing directly at the source, and both thermocouples are energized, the indicator will therefore emit a signal representing the combined effect of the two modulated currents. If the focussing device deviates slightly to either side however the signal will change to one representing one or other of the modulated currents only, and the user will be able to tell at once from the nature of the change which of the thermocouples has become de-energized and consequently what action must be taken to bring the focussing device back to the position in which it points directly at the source.

Preferably the modulations are produced by interrupting, completely or partially, the currents in the two amplifying circuits, the interruptions being complementary (e. g. in dot and dash rhythm) so that when both pick-up devices are energized a continuous illumination or note is obtained from the indicator.

The indicator may be constituted by a glow discharge tube (e. g. a neon lamp) or by a loudspeaker or telephone receiver. If a glow discharge tube is used, the currents from both output circuits must be passed through the tube. In the case of a loud-speaker or telephone receiver however there will be no objection to using two such devices, one in each output circuit, provided they are located sufficiently closely together for the sounds produced to blend together to form the composite note when both are operating. The expression "common to the two output circuits" as used herein and in the appended claims is accordingly to be understood as including such a duplicated arrangement in the case of an indicator giving aural signals.

It is most convenient to employ a single reflector as the focussing device. In the case of a sea-going or land vehicle the apparatus will in general only be required to indicate the bearing of the source and two thermocouples only will be required at the focus of the reflector. The image of the source formed at the focus will be of sufficient size to fall on and energize the two thermocouples to an equal extent when the reflector is pointed directly at the source. When, however, the reflector deviates slightly, one or other of the thermocouples will no longer be covered by the image, and the indicating means will inform the navigator which of the thermocouples is no longer energized and so enable him to correct his course accordingly. Where, however, the apparatus is to be installed in an aircraft, it will generally be necessary, owing to the three-dimensional nature of the problem of setting the aircraft on the correct course to fly towards the source, to have more than two thermocouples at the focus, and it is preferred to use four, one pair indicating deviations from the correct bearing and the other pair indicating deviations from the correct elevation. In this case, each pair of thermocouples will, in general, be associated with a separate indicator, one for indicating vertical deviations and the other for indicating horizontal deviations, and the two thermocouples of each pair will be differentiated from one another by imposing modulations on their respective circuits as described above. In some cases, however, as explained below, it is possible to use a single indicator common to all four thermocouples.

It is preferred to use a reflector as the focussing device rather than a lens system, firstly because a lens system will only be capable of bringing radiation of a definite wave-length to a given focus, and secondly because the lenses will in general have to be made of a special material transparent to the infra red radiation to be detected.

As an alternative, the focussing device may consist of a pair of reflectors operating in the same plane and having overlapping reception zones, a single thermocouple being located at the focus of each reflector.

It will be appreciated that such an apparatus offers three avenues of approach for the radiation from the distant source, namely two outer ones, in the case of each of which radiation is received by one of the reflectors only, and a central one corresponding to the overlap of the reception zones, in the case of which radiation is received by both reflectors and the indicating means will show that both thermocouples are energized. The navigator of a sea-going vessel or driver of a land vehicle, such as a tank, equipped with such an apparatus, can consequently pick up the direction of the source by orientating his craft until the indicating means becomes alive and thereafter travel towards the source by steering so as to keep both thermocouples energized, the direction of any deviation from the proper course and consequent de-energization of one of the thermocouples being shown by the indicating means.

In the case of an aircraft, this form of apparatus will also have to be duplicated, in the sense that two such pairs of reflectors or the like will be required, each associated with a pair of thermocouples, one pair of thermocouples indicating deviations from the correct bearing and the other deviations from the correct elevation.

To produce the required fluctuating currents in the amplifying circuits some form of high frequency interrupter will in most cases be necessary. A high speed mechanical interrupter, such as a rotating disc having a serrated edge, located between the source of radiation and the thermocouple and serving to expose and obscure the thermocouple at rapidly recurring intervals may be used. Such a device introduces obscuration and lag, which considerably reduces the E. M. F., and consequently it is preferred to employ a mechanical interrupter located in the grid circuit of one of the amplifying valves.

In order to impose on each thermocouple a distinguishing characteristic, e. g. a dot or dash signal, a secondary low frequency interrupter will be required. This again may be constituted by a mechanical interrupter located between the source of radiation and the thermocouple, but it is preferred to use a mechanical or electrical interrupter which imposes the distinguishing characteristic during or after amplification.

For example, the interruption to produce the dot and dash signals may be effected, in each circuit, by a commutator, either at the grid or output or any valve in the amplifier, or by a commutator controlling the high tension in the screen grid of a tetrode or pentode forming part of the amplifier. Again a commutator interrupting the high tension of a diode may be used. As a further alternative, the interruption may be effected by a thyratron or similar control such as is used in modern time base control in connection with cathode ray tubes for television or other purposes. Again a rotary condenser may be used, the vanes and intervening spaces of which are so formed as to give more or less full capacity for a period equal to that of the signal required, with no capacity in the intervals between the signals.

While it has been stated above that each thermocouple is associated with a single amplifier, it should nevertheless be understood that, in some cases, a common amplifier may be employed for all the thermocouples, such amplifier cooperating with the thermocouples and with the indicating means by means of apparatus of the kind employed for the synchronous transmission of multiple signals, e. g. for multiplex transmission in telegraphy.

Also, while reference has been made above to the location of a "source" of radiation, this expression as used herein and in the appended claims, is to be understood as including an object to be located with the aid of radiation reflected from it as an alternative to radiation emitted by it. Thus the apparatus according to the invention is suitable for the location of an aircraft at night by means of radiation emitted from a source on the ground or elsewhere, and reflected or scattered by the aircraft to be located.

Some methods of and apparatus for carrying the invention into practice will now be described in greater detail by way of example, with reference to the accompanying drawings, in which.

Figure 1:
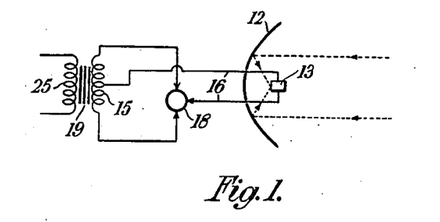
Figure 1 is a diagram showing an apparatus for employing infra-red rays with a single reflector having four thermo-couples located at its focus.
Figure 2:
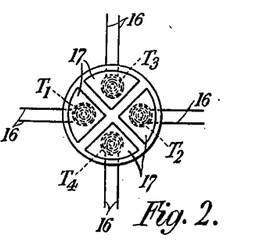
Figure 2 is an enlarged front elevation of the thermo-couples.

Referring first of all to Figs. 1 and 2, 12 represents a single parabolic reflector having at its focus an evacuated tube 13 containing four high efficiency low lag thermo-couples $T_1$, $T_2$, $T_3$, $T_4$. As indicated in Fig. 2 each thermo-couple consists of a number of "hot junctions" arranged in series and in spiral formation, and is provided with a pair of leads 16. The thermo-couples are insulated from one another and on the forward end of each, i. e. the end facing the reflector, is mounted a disc 17 of copper, silver or like metal for receiving the radiation, the discs 17 being mounted on the thermo-couples by means of an electrically insulating wax. The front end of the tube 13 is provided with a window (not shown) of a material transparent to infra-red radiation.

Figure 4:
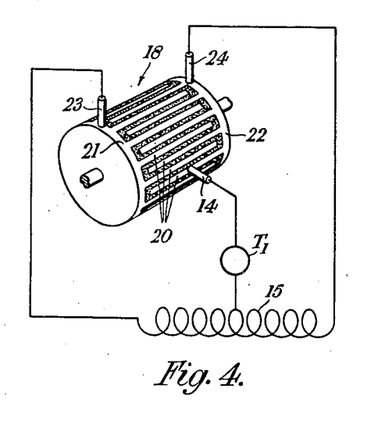
Figure 4 is a perspective view of a commutator for converting the thermo-couple current into high frequency A. C.

The leads 16 of each thermo-couple are connected, as shown in Fig. 1, to a commutator 18 shown in detail in Fig. 4. For simplicity Fig. 1 shows only the commutator 18 and associated transformer 19 for one of the thermo-couples, but it will be understood that four similar assemblies will be provided, one for each thermo-couple, the four commutators being mounted on a common shaft.

The commutator 18 consists of a rotary drum on which is mounted a number of conducting segments 20, which are connected alternately to a left hand slip ring 21 and to a right hand slip ring 22. The positive terminal of the thermo-couple $T_1$, is connected to a brush 14, which contacts with the segments 20 while the negative terminal of the thermo-couple is connected to the centre tapping of a split primary 15 of the transformer 19. Brushes 23, 24 cooperate respectively with the slip rings 21, 22 and are connected to the ends of the split primary 15 as indicated. Consequently, when the thermo-couple $T_1$ is energized, an alternating current will flow in the secondary 25 of the transformer which is coupled to an amplifier as hereinafter described. The frequency of this current will be determined by the speed of rotation of the commutator and the spacing of the segments 20, and is conveniently of the order of 300–500 cycles per second, while its amplitude will be dependent upon the quantity of radiation falling on the thermo-couple per unit time.

Figure 3:
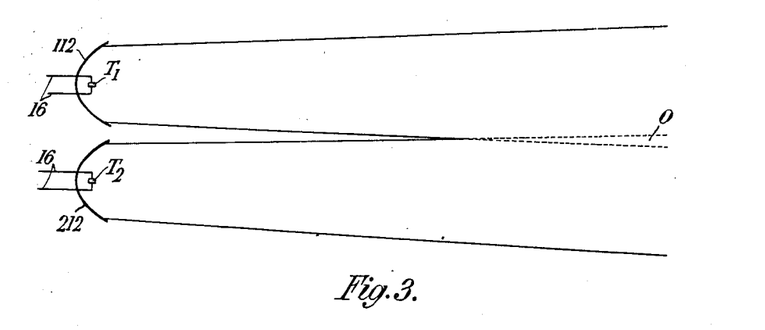
Figure 3 is a diagram showing an apparatus employing a pair of reflectors, each having a thermo-couple at its front.

Figure 3 shows an alternative arrangement in which, instead of locating all the thermo-couples at the focus of a single reflector, two reflectors 112 and 212 are used, single thermo-couples $T_1$, $T_2$ being located respectively one at the focus of each reflector. The reflectors are mounted with their axes slightly divergent and so that they have overlapping reception zones. When the source of radiation lies within the overlap O both thermo-couples will be energized. When however it departs to either side, one or other of the thermo-couples will be de-energized. As explained above, where deviations both horizontally and vertically require to be detected, a second pair of reflectors similar to that illustrated and operating in a plane at right angles to the plane of the paper will be required, and a second pair of thermo-couples operating in conjunction with this second pair of reflectors.

Figure 5:
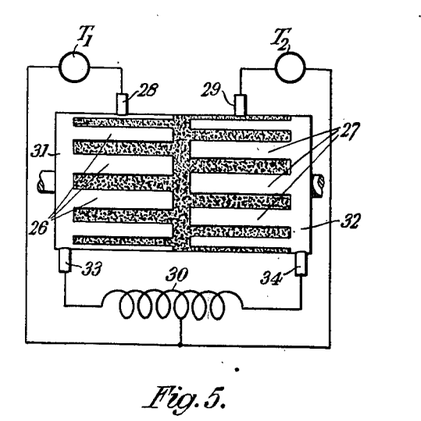
Figure 5 is a front elevation of an alternative form of commutator for use with an amplifying circuit common to two thermo-couples.

Generally, a separate amplifying circuit will be provided for each thermo-couple, but in some cases a common amplifier may be used. An arrangement suitable for this purpose is shown in Fig. 5. This shows a commutator having two sets of conducting segments 26, 27, the segments being staggered but having a slight overlap. Brushes 28, 29 connected to the positive terminals of the two thermo-couples cooperate respectively with the segments 26 and 27. The negative terminals of the thermo-couples are connected to the centre tapping of the split primary 30 of a transformer. The segments 26, 27 are connected respectively to slip rings 31, 32 with which co-operate brushes 33, 34 connected to opposite ends of the split primary 30. The secondary of the transformer is connected to an amplifier common to the two thermo-couples.

With an arrangement of this kind, the two thermo-couples $T_1$, $T_2$ are connected alternately at rapidly occurring intervals to the amplifier. If a similar commutator arrangement to that shown in Fig. 4 is provided in the output circuit of the amplifier, and is arranged to run synchronously with the input commutator, the amplified currents from the two thermo-couples will be separated from one another and will then have dot and dash modulations superimposed on them in the manner subsequently described.

It will be clear that a similar form of commutator to that shown in Fig. 5, but having four sets of staggered conducting segments, may be used to combine the circuits from four thermo-couples in a single amplifier.

In the following description it will be assumed that $T_1$, $T_2$ are the thermo-couples which will indicate deviations in the horizontal plane and $T_3$, $T_4$ are those which will indicate deviations in the vertical plane. Various amplifying circuits will be described and means shown for imposing dot and dash modulations on the circuits associated with the thermo-couples $T_1$, $T_2$, and it will be understood that similar apparatus will be used for the thermo-couples $T_3$, $T_4$.

Figure 6:
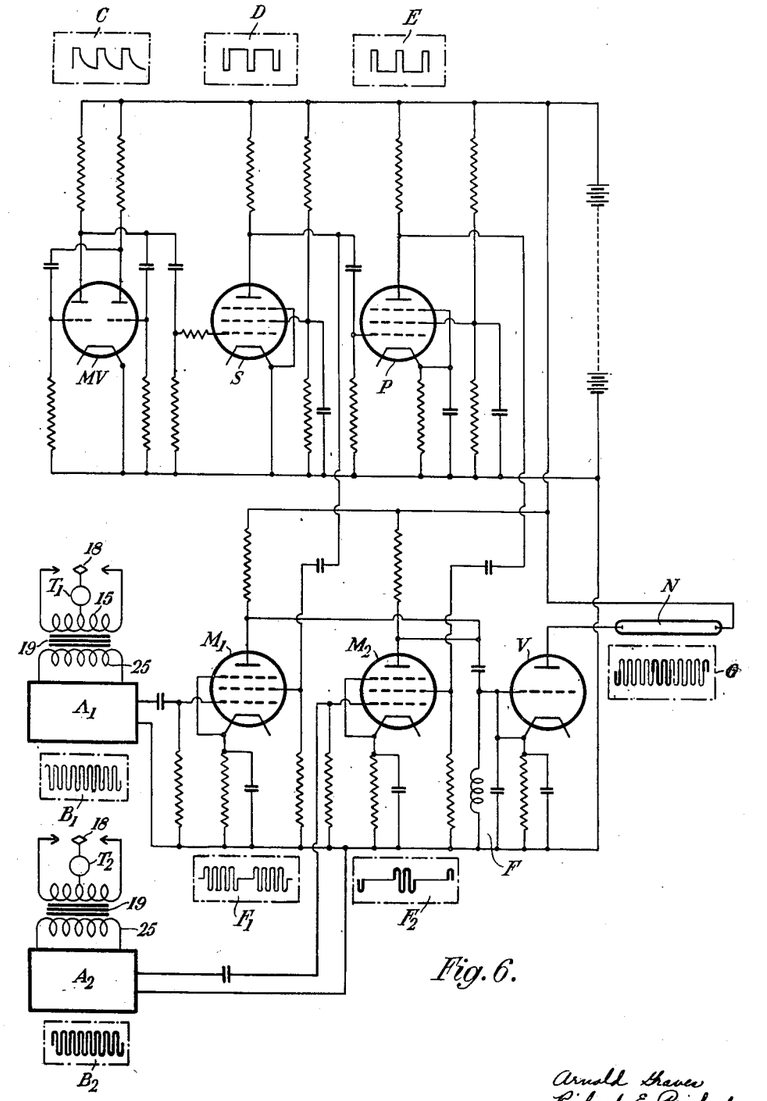
Figures 6, 7, 8 and 9 are wiring diagrams showing different circuit arrangements, for amplifying the currents derived from a pair of thermo-couples, superimposing dot and dash modulations and giving the required visual or aural indications.

Referring first of all to Fig. 6, $A_1$, $A_2$ represent respectively amplifiers coupled to the secondaries 25 of the transformers 19 associated with the thermo-couples $T_1$, $T_2$. The wave forms associated with these amplifiers are indicated respectively by $B_1$, $B_2$, the wave form $B_2$ being shown in thick lines. The commutators 18 being of the same construction and on a common shaft, both wave forms are homogeneous waves representing a frequency of say 300 cycles per second.

The dot and dash modulations are derived, at a low frequency of say 5 cycles per second, from a multi-vibrator MV, which as is known may consist of a cross-connected double triode. By suitable choice of the impedances in the circuit, the multi-vibrator MV may be adjusted to generate a wave form, indicated by C, representing a somewhat distorted dot signal of the required frequency.

The wave form from the multi-vibrator MV is passed to a shaping valve S, the action of which is to limit and shape the signal to a cleaned square form D. This will be of dash form and not of dot form because of the phase reversing effect of the shaping valve. The output of the shaping valve is divided, part of it being passed direct to a mixing valve M₁, which mixes it with the output of the first amplifier A₁, and the other being passed, via a phase reversing valve P, to a second mixing valve M₂ which mixes it with the output of the second amplifier A₂. The effect of the phase reversing valve P is to convert the squared dash wave form D into a squared dot wave form E.

The mixing valves are constituted by pentodes, the high frequency current at 300 cycles being applied from the amplifiers A₁, A₂ to the control grids of the mixing valves M₁, M₂ respectively and the low frequency modulating currents at 5 cycles being applied, from the shaping valve S and phase reversing valve P respectively to the screen grids of the pentodes M₁, M₂. The outputs of the mixing valves M₁, M₂ will then consist respectively of signals at the high frequency of the input current interrupted in dash and dot spacing as indicated by the wave forms F₁, F₂. The two ouputs are then combined and taken after amplification by a valve V, to a common neon lamp N.

As the dot and dash signals have the same origin in wave form, the one being derived from the other by phase inversion, the no signal spaces between the dots will be equal in duration to the dashes, and the outputs of the mixing valves will combine when the input currents in the two circuits are of equal amplitude, to produce the wave form G and a continuous glow in the neon lamp N. If either of the thermo-couples T₁ or T₂ becomes de-energized however, the associated input current will cease, and the neon lamp will give an intermittent illumination, in dot or dash rhythm, thus indicating which of the thermo-couples is de-energized and so notifying the navigator in which direction he must steer to bring him back to the proper course.

It is generally however more convenient to use a telephone receiver or loud-speaker in place of the neon lamp, and in this case a continuous note will be heard when both thermo-couples are energized, a dot note when T₁ is de-energized and a dash note when T₂ is de-energized. The dot and dash signals will produce a series of clicks in the loud-speaker, but these can be eliminated by the use of a filter circuit F in parallel with the grid of the final amplifying valve V which will accept the low frequencies but reject the 300 cycle frequency, so that the main frequency only will be passed to the valve V and therefore to the loud-speaker.

It has already been explained that the other two thermo-couples T₃, T₄ will be associated with similar amplifying and modulating circuits. By arranging that the commutators for the thermo-couples T₃, T₄ give an input current at say 500 cycles, it is possible to use a common loud-speaker for the final output valves V of the two pairs of thermo-couples. Then the dot and dash signals indicative of deviations in bearing and elevation will be heard at easily distinguishable frequencies, i. e. 300 and 500, so that the single loud-speaker will give the information necessary for correcting errors both in bearing and elevation.

Figure 7:
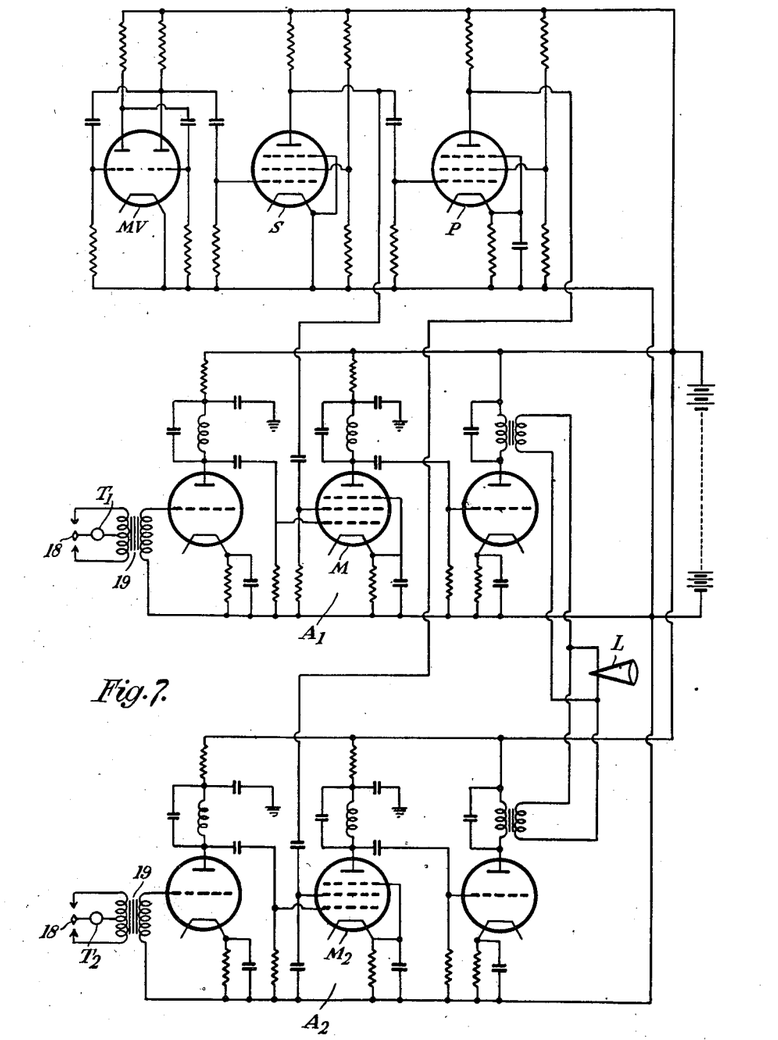

The arrangement shown in Fig. 7 is generally similar to that of Fig. 6, except that in this instance the second valves of the amplifiers A₁, A₂ associated with the two thermo-couples are employed as the mixing valves M₁, M₂. This leads to economy in the number of valves and a more compressed form of layout. L represent a loud-speaker connected in parallel to the output circuits of the two amplifiers.

Figure 8:
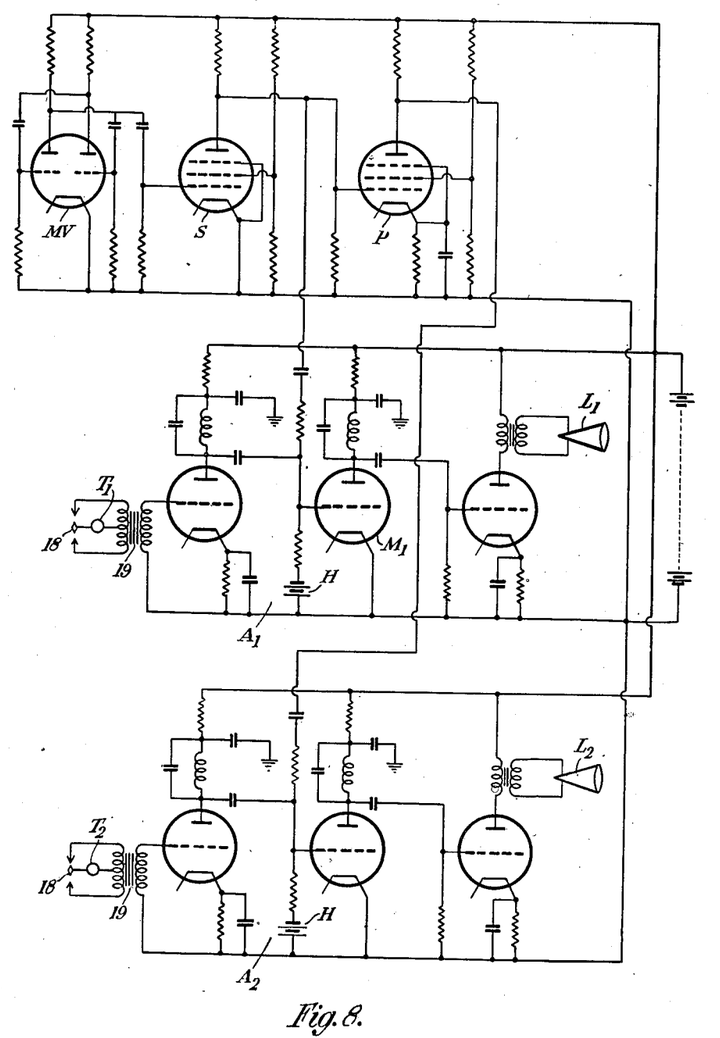

Fig. 8 shows another arrangement similar to that of Fig. 7, but in this case triodes are used as the mixing valves M₁, M₂ in place of pentodes. The input current and the modulating current are applied together to the control grid of each mixing valve, which is given a large negative grid bias, e. g. about 30 volts, by means of a battery H. The result is that current will only flow through the mixing valve when the positive part of the dot or dash wave form, as the case may be, counteracts the negative bias. In this arrangement separate loud-speakers L₁, L₂ are associated with the output circuits of the two amplifiers A₁, A₂.

Figure 9:
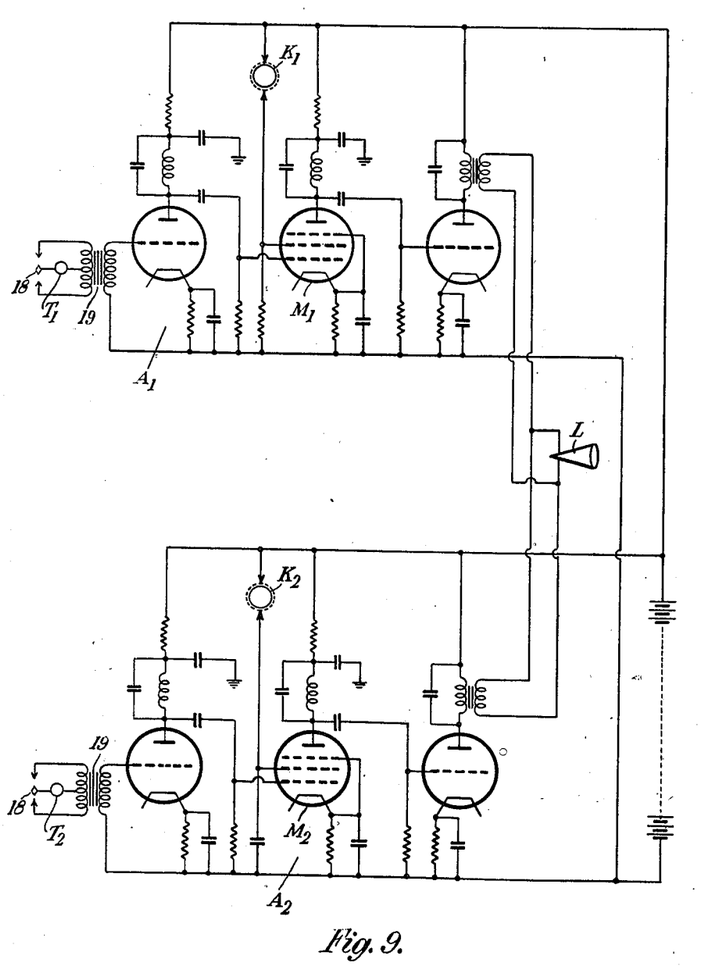

In Fig. 9 is shown an arragement, similar to that of Fig. 7, in that pentode valves M₁, M₂ constituting the second valves of the amplifiers A₁, A₂ are employed as mixing valves. In this case however the modulations are not derived electrically but are produced by commutators K₁, K₂ controlling the supply of high tension to the screen grids of the mixing valve. The commutators K₁, K₂ are mounted on a common shaft but the spacing of their conducting segments is such that they serve respectively to interrupt the input current in dash and in dot form and so produce the required modulation.

What we claim as our invention and desire to secure by Letters Patent is:

1. Apparatus for the directional location of a source of infra-red radiation, comprising a reflector arranged to concentrate the received radiation at a focus, a pair of thermocouples located adjacent the focus of said reflector, said thermocouples being so disposed in relation to the reflector as to be both energized when the reflector is pointing directly at the source but to be selectively de-energized on deviation of the reflector from the source according to the direction of said deviation, an amplifier connected with each thermocouple, means for producing in the amplifier output circuits, when said thermocouples are energized, pulsating currents of substantially equal frequency, devices for imposing on the currents in said respective output circuits lower frequency thermocouple - identifying modulations which are different and distinguishable from one another, and an indicator common to the two output circuits for emitting a composite signal representing the combined effect of the modulated currents in the output circuits.

2. Apparatus for the directional location of a source of infra-red radiation, comprising a pair of thermocouples, an amplifier common to the two thermocouples, an input commutator for connecting the amplifier in rapidly alternating succession with the two thermocouples, an output commutator operating in timed relationship with the input commutator to connect the amplifier in rapidly alternating succession to two output circuits to produce pulsating currents therein, a focussing device for concentrating the radiation on the thermocouples, said thermocouples being so disposed in relation to the focussing device as to be both energized when the focussing device is pointing directly at the source, but to be selectively de-energized on deviation of the focussing device from the source according to the direction of said deviation, devices for imposing on the pulsating currents in the two output circuits lower frequency thermocouple-identifying modulations which are different and distinguishable from one another, and an indicator common to the two output circuits for emitting a composite signal representing the combined effect of the modulated currents in the output circuits.

3. Apparatus for the directional location of a source of infra-red radiation, comprising a reflector arranged to concentrate the received radiation at a focus, a pair of thermocouples located adjacent the focus of said reflector, said thermocouples being so disposed in relation to the reflector as to be both energized when the reflector is pointing directly at the source, but to be selectively de-energized on deviation of the reflector from the source according to the direction of said deviation, an amplifier connected with each thermocouple, a commutator interposed between each thermocouple and its amplifier, and additional means cooperating with said commutator serving to convert the thermocouple current into high frequency alternating current in the amplifier, the currents in the two amplifiers being of substantially equal frequency, low frequency interrupters for imposing on the currents in the output circuits of the amplifiers lower frequency thermocouple-identifying modulations which are different and distinguishable from one another, and an indicator common to the two output circuits for emitting a composite signal representing the combined effect of the modulated currents in the output circuits.

4. Apparatus for the directional location of a source of infra-red radiation, comprising a reflector arranged to concentrate the received radiation at a focus, a pair of thermocouples located adjacent the focus of said reflector, said thermocouples being so disposed in relation to the reflector as to be both energized when the reflector is pointing directly at the source, but to be selectively de-energized on deviation of the reflector from the source according to the direction of said deviation, an amplifier connected with each thermocouple, a commutator interposed between each thermocouple and its amplifier, and additional means cooperating with said commutator serving to convert the thermocouple current into high frequency alternating current in the amplifier, the currents in the two amplifiers being of substantially equal frequency of the order of 300–500 cycles per second, low frequency interrupters for imposing on the currents in the output circuits of the amplifiers lower frequency thermocouple-identifying modulations of the order of 5 cycles per second which are different and distinguishable from one another, and an indicator common to the two output circuits for emitting a composite signal representing the combined effect of the modulated currents in the output circuits.

5. Apparatus for the directional location of a source of infra-red radiation, comprising a reflector arranged to concentrate the received radiation at a focus, a plurality of thermocouples located adjacent the focus of said reflector, said thermocouples being so disposed in relation to the reflector as to be all energized when the latter is pointing directly at the source, but to be selectively de-energized on deviation of the reflector from the source according to the direction of said deviation, amplifying means connected with the thermocouples, a plurality of output circuits connected respectively with the amplifying means and allocated each to at least one of the said thermocouples, a transformer with a split primary winding connected in the input circuit of each of said amplifying means, a commutator connected to said primary winding and to such of the thermocouples as are allocated to said amplifying means, whereby when the thermocouples are energized, high frequency alternating currents are produced in the amplifier output circuits, devices for imposing upon the high frequency alternating currents in said respective output circuits, lower frequency thermocouple-identifying modulations which are different and distinguishable from one another, and an indicator common to the output circuits for emitting a composite signal representing the combined effects of the modulated currents in the output circuits.

6. Apparatus as claimed in claim 1 comprising in addition another pair of thermocouples so constructed and arranged as to detect deviations in a plane at right angles to the plane of deviation indicated by the first named pair of thermocouples, and pulsating current producing means, amplifying means, modulation imposing means, and indicating means, connected to said second named pair of thermocouples as in the case of the first named pair, whereby deviation in both elevation and bearing of the source of radiation may be determined.

7. Apparatus as claimed in claim 1 comprising in addition another pair of thermocouples so connected and arranged as to detect deviations in a plane at right angles to the plane of deviation detected by the first named pair of thermocouples, and pulsating current producing means, amplifying means, and modulation imposing means, connected to said second named pair of thermocouples as in the case of the first named pair, the pulsating current producing means of the second named pair of thermocouples adapted to produce currents in its amplifiers of different frequency than that of the currents produced in the amplifiers of the other pair, and means for connecting all of the output circuits to said indicator, whereby deviation in both elevation and bearing of the source of radiation may be determined.

8. Apparatus for the directional location of a source of infra-red radiation, comprising a pair of thermocouples, a focussing device for concentrating the radiation on the thermocouples, said thermocouples being so disposed in relation to the focussing device as to be both energized when the focussing device is pointing directly at the source, but to be selectively de-energized on deviation of the focussing device from the source according to the direction of said deviation, an amplifier connected with each thermocouple, a commutator interposed between each thermocouple and its amplifier, and additional means cooperating with said commutator and serving to convert the thermocouple current into high frequency alternating current in the amplifier, the currents in the two amplifiers being of substantially equal frequency, low frequency interrupters for imposing on the currents in the output circuits of the amplifiers lower frequency thermocouple-identifying modulations which are different and distinguishable from one another, and an indicator common to the two output circuits for emitting a composite signal representing the combined effect of the modulated currents in the output circuits, each of said amplifiers including a screen grid valve, and each low frequency interrupter being constituted by a commutator operating to interrupt periodically the high tension supply to the screen grid of said valve, the current from the thermocouple being supplied to the control grid of said valve.

9. Apparatus for the directional location of a source of infra-red radiation, comprising a pair of thermocouples, an amplifier connected with each thermocouple, means for producing in the amplifier output circuits, when said thermocouples are energized, pulsating currents of substantially equal frequency, a focussing device for concentrating the radiation on the thermocouples, said thermocouples being so disposed in relation to the focussing device as to be both energized when the focussing device is pointing directly at the source but to be selectively de-energized on deviation of the focussing device from the source according to the direction of said deviation, devices for imposing on the currents in said respective output circuits lower frequency thermocouple-identifying modulations which are different and distinguishable from one another, and an indicator common to the two output circuits for emitting a composite signal representing the combined effect of the modulated currents in the output circuits, an electrical interrupter for imposing a modulation in dash rhythm on the output circuit of the amplifier connected with the one thermocouple and a complementary modulation in dot rhythm on the output circuit of the amplifier connected with the other thermocouple, said interrupter comprising a multi-vibrator, a shaping valve, a phase-reversing valve, and a pair of mixing valves one associated with each amplifier, the shaping valve being connected to the output of the multi-vibrator, and the output of the shaping valve being divided, one part being fed direct to the one mixing valve and the other part being fed through the phase-reversing valve to the other mixing valve.

10. Apparatus for the directional location of a source of infra-red radiation, comprising a pair of thermocouples, an amplifier connected with each thermocouple, means for producing in the amplifier output circuits, when said thermocouples are energized, pulsating currents of substantially equal frequency, a focussing device for concentrating the radiation on the thermocouples, said thermocouples being so disposed in relation to the focussing device as to be both energized when the focussing device is pointing directly at the source but to be selectively de-energized on deviation of the focussing device from the source according to the direction of said deviation, devices for imposing on the currents in said respective output circuits lower frequency thermocouple-identifying modulations which are different and distinguishable from one another, and an indicator common to the two output circuits for emitting a composite signal representing the combined effect of the modulated currents in the output circuits, an electrical interrupter for imposing a modulation in dash rhythm on the output circuit of the amplifier connected with the one thermocouple and a complementary modulation in dot rhythm on the output circuit of the amplifier connected with the other thermocouple, said interrupter comprising a multi-vibrator, a shaping valve, a phase-reversing valve, and a pair of pentodes, each associated with one of the amplifiers and having the input from the associated thermocouple connected to its control grid, the shaping valve being connected to the output of the multi-vibrator, and the output of the shaping valve being divided, one part being fed direct to the screen grid of the one pentode and the other part being fed through the phase-reversing valve to the screen grid of the other pentode.

11. Apparatus for the directional location of a source of infra-red radiation, comprising a reflector arranged to concentrate the received radiation at a focus, a pair of thermocouples located adjacent the focus of said reflector, said thermocouples being so disposed in relation to the reflector as to be all energized when the latter is pointing directly at the source, but to be selectively de-energized on deviation of the reflector from the source, according to the direction of said deviation, amplifying means connected with the thermocouples, a plurality of output circuits connected with the amplifying means and allocated one to each thermocouple, means for producing in said output circuits, when their associated thermocouples are energized, high frequency pulsating currents, devices for imposing on the currents in said respective output circuits lower frequency thermocouple-identifying modulations which are different and distinguishable from one another, and an indicator common to the output circuits for emitting a composite signal representing the combined effects of the modulated currents in the output circuits.

ARNOLD GRAVES.
RICHARD EVAN PRICHARD.